United States Patent [19]

Cobbs et al.

[11] Patent Number: 5,109,239
[45] Date of Patent: * Apr. 28, 1992

[54] INTER PEN OFFSET DETERMINATION AND COMPENSATION IN MULTI-PEN INK JET PRINTING SYSTEMS

[75] Inventors: Keith E. Cobbs; Robert D. Haselby, both of San Diego; William S. Osborne, Escondido, all of Calif.

[73] Assignee: Hewlett-Packard Company, Palo Alto, Calif.

[*] Notice: The portion of the term of this patent subsequent to May 1, 2007 has been disclaimed.

[21] Appl. No.: 490,022

[22] Filed: Mar. 7, 1990

Related U.S. Application Data

[63] Continuation-in-part of Ser. No. 304,980, Jan. 31, 1989, Pat. No. 4,922,270.

[51] Int. Cl.$^5$ .......................... B41J 3/04; G01D 18/00
[52] U.S. Cl. ................................ 346/140 R; 346/1.1; 250/222.1
[58] Field of Search .......................... 346/140, 75, 1.1; 250/222.1

[56] References Cited

U.S. PATENT DOCUMENTS

| | | | |
|---|---|---|---|
| 4,323,905 | 4/1982 | Reitberger et al. | 346/75 |
| 4,509,057 | 4/1985 | Sohl et al. | 346/140 |
| 4,768,045 | 8/1988 | Koto | 346/140 |
| 4,922,270 | 5/1990 | Cobbs et al. | 346/140 R |

FOREIGN PATENT DOCUMENTS

0001773 1/1982 Japan .................................. 346/140

Primary Examiner—Benjamin R. Fuller
Assistant Examiner—Alrick Bobb

[57] ABSTRACT

Apparatus for determining inter-pen offsets in a multiple pen ink jet printer including a drop detector for measuring flight time of ink drops, an aperture plate disposed in the print media plane, and a carriage position sensor for determining carriage position when ink drop flight time exceeds a predetermined value, which indicates that an ink jet is at the edge of the aperture plate. The sensed carriage positions for the respective pens provides information indicative of inter-pen offset in the scan axis direction. In a further embodiment of the invention, the aperture plate can have a stair-shaped boundary to facilitate the calibration of a plurality of nozzles in one scan. For determination of inter-pen offset in the media scan direction, the aperture includes a comb-like boundary that is utilized to produce detect/no detect pattern for a nozzle array in each of the pens, whereby the pattern for each of the pens provides information indicative of the offset between pens.

12 Claims, 4 Drawing Sheets

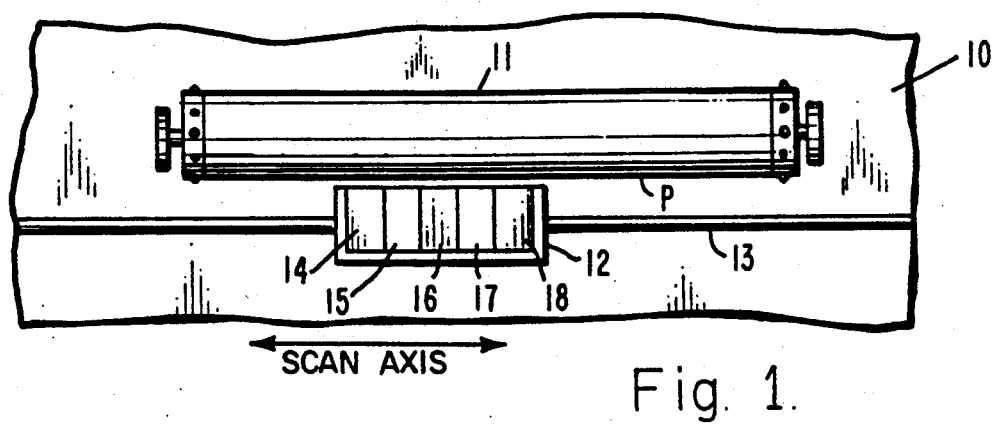
Fig. 1.
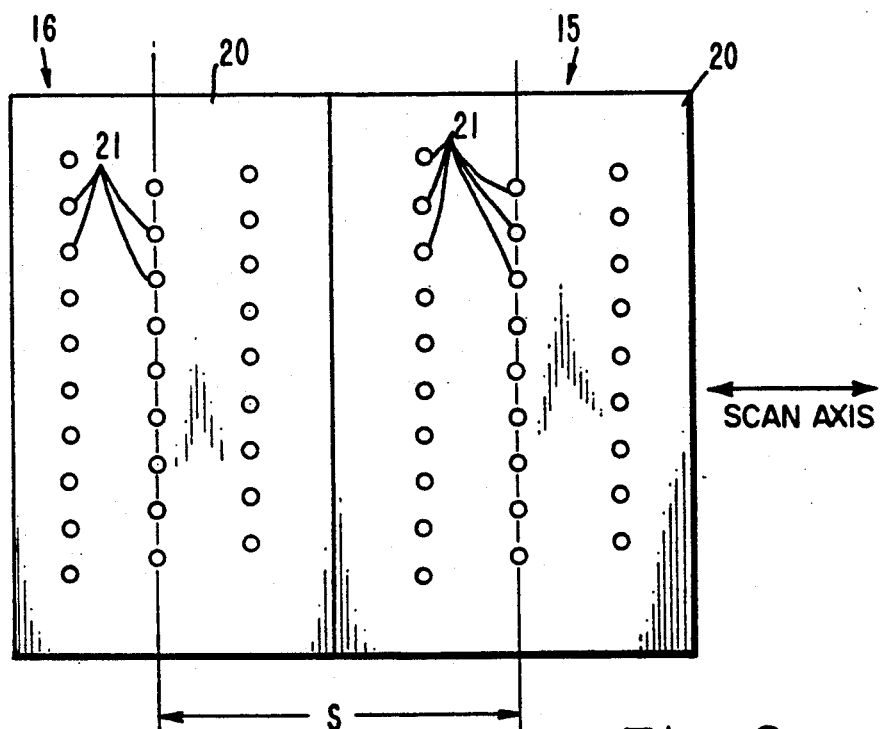
Fig. 2.
Fig. 3.
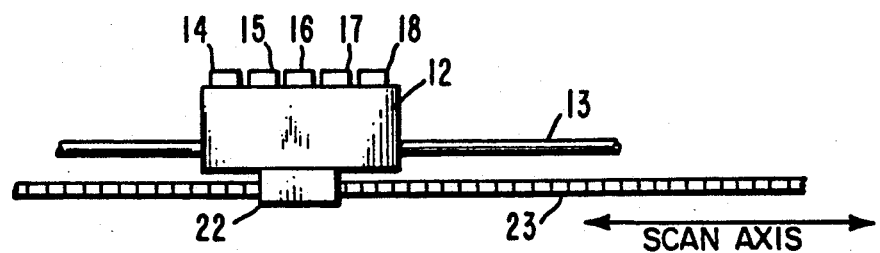

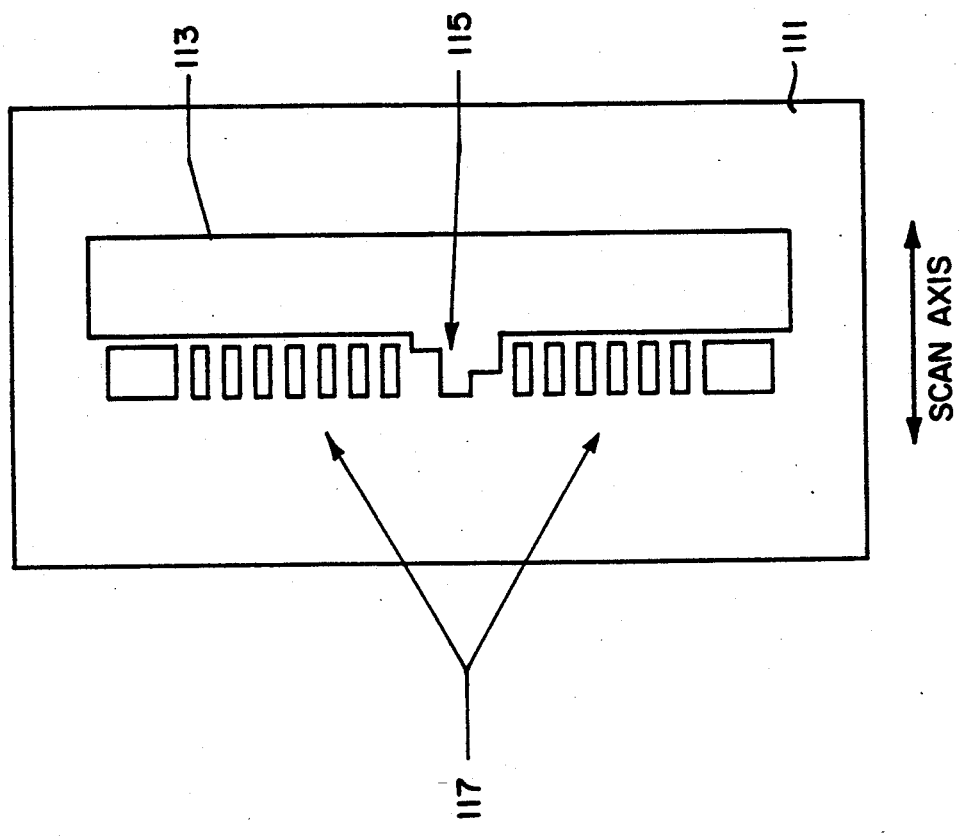

INTER PEN OFFSET DETERMINATION AND COMPENSATION IN MULTI-PEN INK JET PRINTING SYSTEMS

This is a continuation-in-part of U.S. patent application Ser. No. 07/304,980, filed Jan. 31, 1989, now U.S. Pat. No. 4,922,270 issued May 1, 1990.

BACKGROUND OF THE INVENTION

The present invention relates to ink jet printing apparatus employing a plurality of printing modules. More particularly, the invention relates to calibrating the distance between pens in the pen scan direction (Y), and calibrating the displacement of nozzle arrays relative to each other in the print media index axis (X).

Color ink jet printers are described in the August 1988 issue of the Hewlett-Packard Journal. In addition, the following U.S. patents disclose ink jet printing technology: U.S. Pat. No. 4,709,245, M. J. Piatt, "Ink Jet Printer for Cooperatively Printing with a plurality of Insertable Print/Cartridges"; U.S. Pat. No. 4,709,246, M. J. Piatt et al., "Adustable Print/Cartridge Ink Jet Printer," U.S. Pat. No. 4,709,247, M. J. Piatt et al., "High Resolution, Print/Cartridge Ink Jet Printer"; U.S. Pat. No. 4,709,248, M. J. Piatt et al., "Traverse Printing Control System for Multiple Print/Cartridge Printer"; all issued Nov. 24, 1987.

SUMMARY OF THE INVENTION

Prior art systems such as those of Piatt et al., coordinate printing with multiple cartridges by detecting and storing location data based on measurements made at the orifice plate. It is a feature of the present invention to detect and store location data in terms of measurements of drop position in the nominal plane of the print media rather than at the orifice plate. The term print media means paper, overhead transparency film, and the like.

Prior art systems such as the Hewlett-Packard Paintjet thermal ink jet printer, for example, provide the three primary colors on a single pen. It is possible with the present invention to provide a separate pen for each of the primary colors, plus one or more black pens.

A feature of the invention is that it enables detecting drop position in two axes, not just one, and may also be used to measure pen rotational errors.

Another feature of the invention is that it compensates for nominal drop directionality errors because it measures drop position in the nominal plane of the print media.

Yet another feature is that a real-time drop detector is employed in the present invention.

A still further feature of the invention is that the position encoder resolution is increased by interpolation.

In accordance with these and other features of the invention, there is provided a color alignment system for multiple pen ink jet printing systems having a capability to measure tolerance-related dot placement errors. This capability allows application of a correction algorithm to the drop fire timing and the image data such that the highest possible quality image is produced. As will be more fully understood hereinafter in conjunction with the detailed description and the accompanying drawings, the calibration system measures the distance between pens in the pen scan direction (Y), and measures the displacement of nozzle arrays in the print media index axis direction (X). The system is comprised of three elements: a drop detector, an aperture plate, and a high resolution carriage position sensor. In addition, and if desired, a wiper system may be employed to clean the aperture plate. The aperture plate is located between the pen orifice and the drop detector.

The position sensor or encoder is integral to the pen carriage and provides a constant output of carriage position as the pens are moved past the aperture plate. A change of state is created at the detector as the drop stream passes over the edge of the aperture plate. Correlation of the carriage position signal and state change at the detector provides the measurement of inter-pen spacing in the pen scan direction (Y). In accordance with the invention, two methods of making this measurement are provided. In one method, the pens are fired first at the aperture plate, and then moved to fire at the drop detector. In the second method, the flight time of each drop is measured. Drops are first fired at the drop detector as the pen is moved toward the aperture plate. As drops impact the aperture plate, their flight times increase in proportion to the percent of the drop impacting the edge of the aperture plate. The measurement is made using the drop flight time and position information.

The displacement of nozzle arrays in the print media index axis direction (X) is measured by successively positioning each pen over a special pattern provided in the aperture of the aperture plate, and firing the nozzles individually to produce a detect/no detect pattern for the nozzles of each of the pens. The patterns for the different pens are compared to determine the relative offsets in the media index direction.

BRIEF DESCRIPTION OF THE DRAWINGS

The foregoing and other features of the present invention can be more readily understood with reference to the following detailed description, taken in conjunction with the accompanying drawings, wherein like reference numerals designate like structural elements, and in which:

FIG. 1 is a plan view of a portion of a thermal ink jet printer in accordance with the present invention, shown broken away to illustrate the interior thereof.

FIG. 2 is an elevation view of adjacent orifice plates greatly magnified illustrating the inter-pen spacing between nozzle arrays.

FIG. 3 is an elevation view of the pen carriage showing the integral linear position encoder and its associated code strip.

FIG. 9 illustrates an aperture plate having different patterns for the different calibrations discussed relative to the patterns of FIGS. 7 and 8.

DETAILED DESCRIPTION

Figure 5:
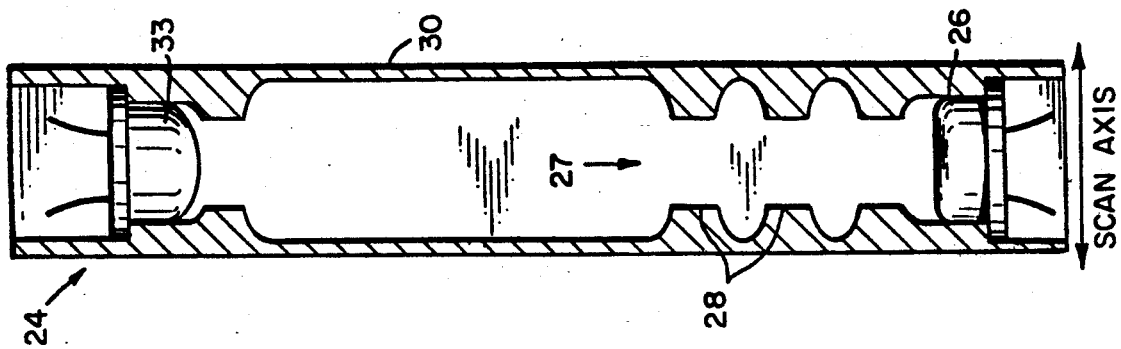
FIG. 5 is another view of the drop detector illustrating the relationship of the component parts thereof.

Referring now to FIG. 1, there is shown a plan view of an ink jet printer 10. The printer 10 is shown broken away, and in the interior thereof there may be seen a roll or platen 11 for carrying and indexing the print media, which may be paper, overhead transparency film, or the like. A carriage 12 is mounted for movement back and forth adjacent the print zone P of the platen 11 along a guide rail 13. Mounted within the carriage 12 are a plurality of disposable print cartridges or pens 14, 15, 16, 17 and 18. There is no fixed order for the pens 14-18, but for purposes of description, it will be assumed that by way of example, pen 14 prints the color cyan, pen 15 magenta, pen 16 yellow, and pens 17 and 18 print black, although only one black pen 17 may be used, if desired. By way of illustrative example, the pens 14-18 are thermal ink jet pens employing heating of a thin-film resistor to fire a drop of ink on demand. It should be appreciated that any type of ink jet technology can be utilized to implement the invention.

Each pen 14-18 has a plurality of nozzles 21 (FIG. 2), and each nozzle 21 can supply a drop of ink on demand as the pen carriage 12 scans across the print media carried by the platen 11.

FIG. 2 shows an elevation view of adjacent orifice plates 20, greatly magnified, which form a part of each of the pens 14-18. The orifice plates 20 are shown with thirty nozzles 21 for convenience of description, although the actual number of nozzles 21 may be more or less than 30, if desired. Furthermore, the orifice plates 20 may have a different configuration than that shown, for example, long and narrow with the nozzles 21 in two rows instead of three.

It has been found that there exists a strong correlation between the alignment of the primary color dots and the quality of the resulting image. In the multi-pen printer of the present invention, the ability to accurately overlay the primary color dots is dependent on manufacturing tolerances in both the pens and the printer. Rather than reduce these tolerances by refining the manufacturing processes, the printer of the preset invention is provided with the capability to measure tolerance-related dot placement errors. This capability allows application of a correction algorithm to the drop fire timing and image data such that the highest possible quality image is produced.

Figure 4:
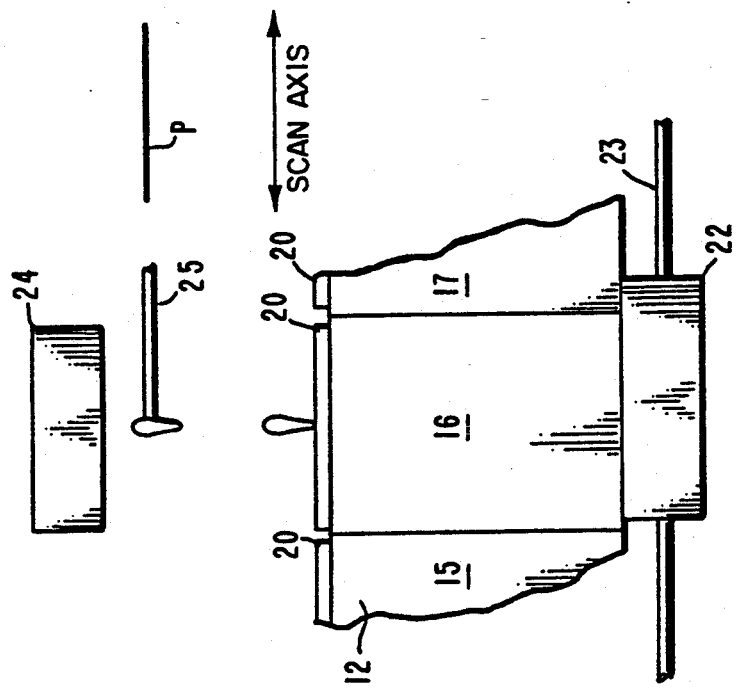
FIG. 4 is a plan view showing a pen firing ink drops past an aperture plate toward a drop detector.

To measure the distances or spacing (S) between pens 14-18 in the pen scan direction (Y), there is provided a linear encoder 22 shown in FIGS. 3 and 4. The linear encoder 22 is a high resolution carriage position sensor with quadrature outputs, the resolution being increased by interpolating between quadrature states. The linear encoder 22 is integral to the pen carriage 12 and provides a constant output of position of the carriage 12 as the pens 14-18 are scanned back and forth along the guide rail 13.

Referring to FIG. 3, the linear encoder 22 which is integral to the carriage 12 employs as a reference a code strip 23. The code strip 23 is a long strip of DuPont Mylar brand material, for example, provided with a marking of opaque lines that are photographically produced, for example. Typically, the code strip 23 may have on the order of 150 lines per inch. The linear encoder 22 may be a linear optical incremental encoder module, such as model HEDS-9200 manufactured by the Optoelectronics Division of Hewlett-Packard Company. A quadrature output of typically 600 to 800 counts per inch is used to operate the motion control system. The reference signal for positioning of ink drops on the print media is generated from a single channel of the encoder 22. This eliminates any possible problem with phase errors in encoder 22.

In prior art devices the position of the orifice plate is detected to determine the distance or spacing (S) between pens in the pen scan direction (Y). In the present invention the position of a drop of ink in the nominal plane of the print media is detected.

In FIG. 4 there is shown a plan view of an arrangement for determining distance between pens in the pen scan direction. To one side of the print zone P, a drop detector 24 is placed in the nominal plane of the print media, and the edge of an aperture plate 25 is placed between the carriage 12 and the drop detector 24. The aperture plate 25 is located to be coplanar with the print zone P.

The construction of the drop detector 24 is illustrated in FIG. 5. A large-area photo diode 26, which may be a Siemens BPX-90 diode, for example, is mounted behind an aperture 27. In the space behind the aperture 27 there are baffles 28 that reduce the effects of ambient light. The nominal cross-section of the detection window 30 typically may be on the order of 2 millimeters by 25 millimeters. The drops remain in the window 30 for the time it takes to traverse the aperture 27, which typically may have a dimension of 1 millimeter.

The illumination end of the drop detector 24 is provided with another aperture 31, at least one additional baffle 32, and a high-output IR light emitting diode (LED) 33. The LED 33 may be a standard high-output plastic unit such as a model OP295A LED, manufactured by TRW, for example. The illumination level is controlled via a feedback operating point error integrator servo that controls the current through the LED 33.

The output of the photo diode 26 is connected to a circuit which includes a comparator having a detection threshold for negative-going signals caused by a drop of ink traversing the detection window 30. The detection threshold tracks any level changes in the signals that are faster than the illumination servo can remove. The comparator output sets a latch which is used as the drop present signal monitored by the microprocessor in the printer. The microprocessor also determines flight time of a drop that traverses the detector window by measuring the time between the firing pulse sent to the thin film resistor and the time of drop detect. This latch is reset each time a drop is fired.

Although an optical drop detector has been employed for use in the above-described embodiment, other drop detectors may also be adapted for use with the present invention.

In accordance with one implementation of the invention, the carriage 12 is scanned at a constant velocity over the aperture plate, moving from right to left so that each of the pens 14-18 will pass over the right edge of the aperture plate. As the first pen approaches the right edge of the aperture, the nozzle at a selected position is fired continuously at the rate of 2000 or more drops per second, with drops first impacting the aperture plate and not being detected. As the nozzle approaches the edge of the aperture, drops pass through and are detected, at which time carriage position is recorded and the nozzle is turned off. As each successive pen approaches the aperture edge, its nozzle at the selected nozzle position is fired and the process is repeated. In other words, one nozzle from each pen is fired in any given pass, and all such nozzles are in the same array position in each pen.

It should be appreciated that timing of the firing of the selected nozzles of the pens after the first pen can be based on the stored encoder position information obtained pursuant to the foregoing procedure for the pen prior in sequence, since the nominal pen spacing is known and the start of firing can be based on the worst case tolerance expected. The firing of the first pen would be controlled to start at about 1 mm, for example, before the aperture edge is traversed.

Since the carriage 12 travels at a constant velocity and the pens 14-18 are fired, in turn, at a constant frequency, the distance or space "S" between the pens 14-18 in the pen scan direction (Y) is easily determined. Comparison of the carriage positions for all pens 14-18 provides the inter-pen spacing (S). This is the method of firing the pens 14-18 first at the aperture plate 25, and then moving them to fire at the drop detector 24.

In accordance with a second implementation of the invention, the inter-pen spacing S is measured by driving the carriage 12 at a constant velocity while firing a selected nozzle from one of the pens 14-18 in sequence at a constant drop firing frequency, and measuring the flight time of the drops. For the pen being activated, drops from the nozzle at the selected nozzle position are first fired through the aperture at the drop detector 24 as the pen is moving from left to right toward the edge of the aperture plate 25. As drops begin to impact the aperture plate 25, their flight times increase (due to a loss of translational momentum in the impact) in proportion to the percent of the drop impacting the edge of the aperture plate 25.

As the pens 14-18 scan along from left to right, the system measures the flight time of each drop that traverses the detector window and stores it in memory along with the position of the encoder 22 and the time from the last position encoder count. When the flight time of a drop exceeds a predetermined threshold value (indicating that it has impacted the edge of the aperture plate 25), the activated nozzle is turned off, to minimize ink buildup at the aperture edge.

The printer microprocessor examines the buffered data to determine the location of the activated pen when drops first began to impact the aperture edge. This may be done by fitting a curve through the collected data to increase accuracy, and the data as to time from the last position encoder count is utilized to interpolate the position of the pen at the time of fire, which provides higher resolution that what is available from the encoder. This process is repeated for each pen until the spacings of the pens are known relative to each other.

The second method provides for repeatable and more accurate results than the first method, and further has the advantage of minimizing the accumulation of the ink on the aperture plate 25.

In employing this method, typically the pens 14-18 can be scanned at a constant velocity on the order of 0.625 inches per second and higher, and the ink drops are fired at a constant firing frequency, typically on the order of 1 to 1.5 kilohertz.

Figure 8:
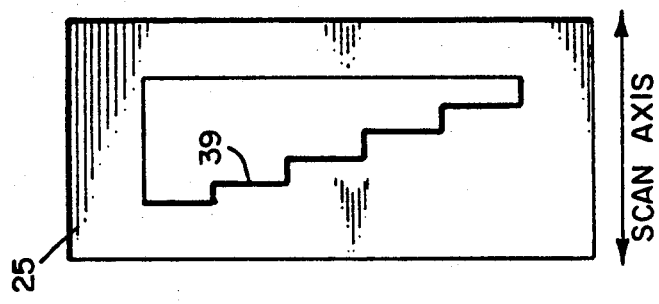
FIG. 8 illustrates a portion of an aperture plate having a pattern therein which permits the simultaneous calibration of a plurality of nozzles in the scan axis.

FIG. 8 illustrates an alternative aperture plate 25' having an aperture pattern 39 therein that permits the simultaneous calibration of a plurality of nozzles 21 that are separated by several nozzles. The aperture pattern 39 has a stair-step shape such that that five nozzles 21, for example, can be simultaneously calibrated. The vertical edges of the stair-stepped boundary of the opening are dimensioned such that the ink drops from the nozzles used for calibration will always fully impact only a vertical edge in the expected worst case trajectory. It should be clear that alternative shapes which implement the results of the stair-stepped opening may be readily designed by those skilled in the art. By way of illustrative example, the width of each of the steps can be about 0.5 millimeters and the distance between steps can be also about 0.5 millimeters.

In accordance with the invention, the carriage 12 is scanned at a constant velocity from right to left so that the nozzles to be used for calibration will pass over the associated leftside vertical edges of the aperture pattern 31 while firing continuously. As to each pen, the firing of a nozzle to be used for calibration is started at a position such that drops initially pass through the opening. When impact of the drops on the edge of the aperture plate is detected as described above, the encoder is read and the nozzle is turned off. With the pattern of FIG. 8, the lowermost nozzle for calibration would be fired first, followed by the next higher nozzle for calibration, and so forth. The horizontal spacing between adjacent left side vertical edges of the pattern is selected to prevent ambiguity in associating detected drops with a particular nozzle. Also, the total horizontal distance between the bottom left side vertical edge of the pattern and the top left vertical edge of the pattern is sufficiently less than the smallest inter-pen distance expected, so as to permit calibration of all pens in one scan.

The pen spacings indicated by the respective nozzle positions can be utilized to provide average inter-pen spacings.

It should be appreciated that the stairstep pattern can also be utilized with the previously described procedure wherein position is detected pursuant to a transition from a no detect condition to a detect condition, which involves initially firing a nozzle to impact the aperture plate.

The accuracy of measurement of inter-pen spacing S is basically dependent on two factors: the accuracy of the linear encoder 22, and the accuracy of the change in state of the drop detector 24 from not detecting to detecting, or vice versa. Measurements have shown that the positional repeatability of the change in state of the drop detector 24 is satisfactory. However, if it should be desired to improve the positional repeatability of the change in state of the drop detector 24, a wiper system may be employed to maintain the aperture plate 25 in an ink-free condition. It has been observed that a bead of ink can develop on the edge of the aperture plate 25 which will cause the effective edge of the aperture plate 25 to move out, which may affect the positional repeatability of the change in state of the drop detector 24.

The resolution of the linear encoder 22 is increased by interpolating between pulses. The measurement of the inter-pen distance or spacing S involves two problems. The carriage 12 is moved at a constant velocity controlled by a servo via the linear encoder 22 and the code strip 23. The first problem in the measurement of inter-pen spacing S is that the very slow speed at which the drop detection must be performed (typically on the order of 0.625 to 0.833 inches per second) necessitates a special servo system configuration. The resolution of the linear encoder 22 is such that one encoder count will be traversed in two milliseconds. The high quality velocity feedback needed for stabilizing the servo loop can be obtained despite the quantization of the encoder feedback by timing between encoder counts.

The second problem is that the resolution of the measurement that is needed is greater than the 0.00125 inch quantization level of the linear encoder 22. This problem is solved by interpolating between encoder counts by means of time measurements. The time elapsed between encoder counts is available from the timing based servo previously described. An additional timer provides the time elapsed from the last encoder count until drop detection is indicated by the drop detector 24. The ratio of these times can be used to interpolate the position of the carriages 12 at the time of the drop detection. Comparison of the positions of the carriage 12 for all pens 14–18 provides the inter-pen spaced (S). Actual test results have shown that position measurements of 0.0004 inch or better are obtained.

This measurement of the inter-pen spacing (S) is performed automatically to one side of the print zone P, and the result of the measurement is converted to a correction algorithm to electronically compensate to drop fire timing and image data. This enables the multi-pen thermal ink jet printer 10 of the present invention to accurately overlay the primary color dots, thus resulting in a high quality image being produced.

Figure 6:
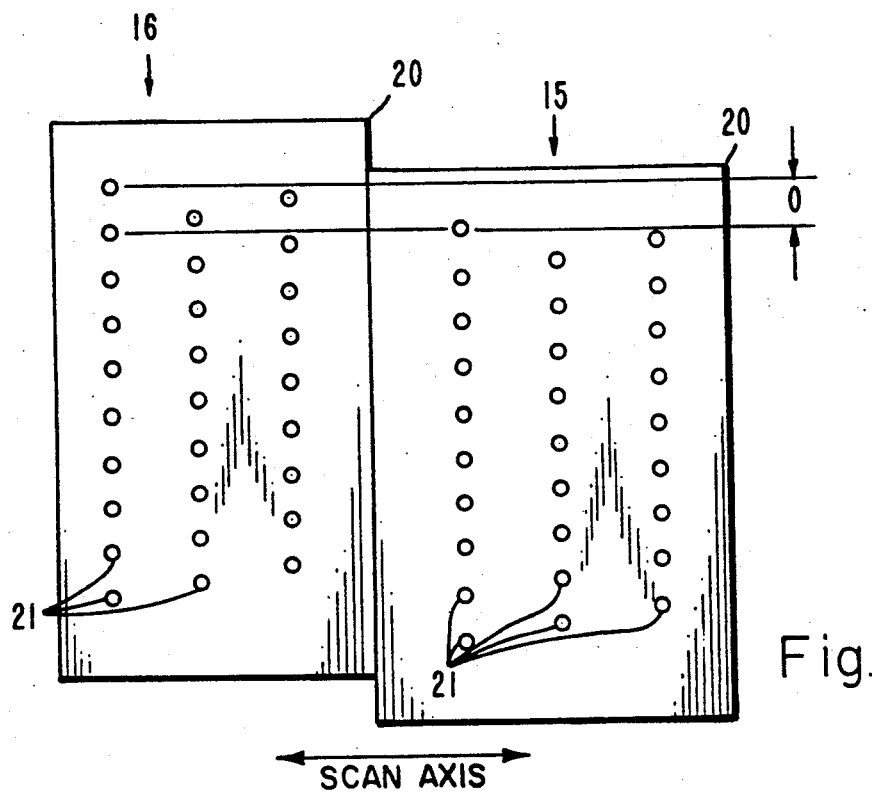
FIG. 6 is an elevation view of adjacent orifice plates greatly magnified illustrating offset between nozzle arrays in the print media index axis.

As is well known, the cartridges or pens 14–18 are replaceable and are held in place by a latch mechanism and by mechanical registration surfaces. The repeatability of registration of the pens 14–18 to the carriage 12 directly affects the print quality. The body of the print cartridges or pens 14–18 has some uncertainty in dimension. Discrepancies in alignment of the pens 14–18 may result in offsets O or displacements of nozzle arrays relative to each other in the print media index axis (X) as shown in FIG. 6. X-axis measurements are made by successively positioning each one of the pens 14–18 over a special pattern provided in the aperture plate 25 and individually firing each nozzle 21 in succession to determine the location of the nozzle pattern.

Figure 7:
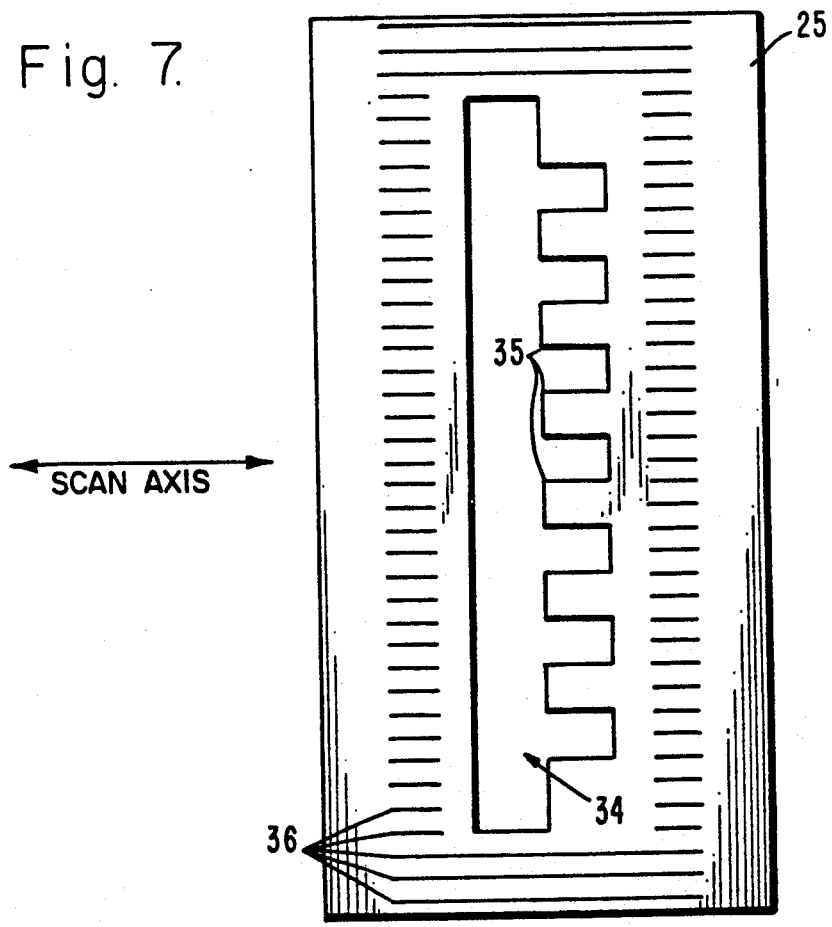
FIG. 7 is an elevation view of an aperture plate greatly magnified to show the construction thereof, and especially the special pattern therein for calibrating pen offsets.

Referring now to FIG. 7, a precision etched aperture plate 25 is provided with an opening 34 having teeth 35 disposed in a special vernier comb-like pattern. Surrounding the opening 34 in the aperture plate 25 are a plurality of ink drain slots 36.

As indicated in FIG. 4, the pens 14–18 are individually positioned adjacent the aperture plate 25, and each nozzle 21 is fired individually in succession toward the drop detector 24. Drops from some of the nozzles impact the teeth 35 of the comb-like pattern and are not detected by the drop detector 24, while drops from other nozzles pass through the opening 34 between the teeth 35 and are detected by the drop detector 24. This information is then mapped into the known position of each nozzle 21 to create a pattern of detect/no detect for each of the pens 14–18. The patterns from each of the pens 14–18 are then compared to determine the relative offsets (O) from pen-to-pen. If two of the pens 14–18 are determined to be out of alignment by more than one-half a dot row, the image data is shifted up or down in the nozzle arrays to produce the optimum alignment. Note that by doing so, nozzles 21 at the ends of the arrays might be rendered non-usable.

The algorithm is a detect/no detect pattern generated from each of the pens 14–18 to determine relative pen-to-pen offsets (O). This algorithm for the pen alignment in the print media index axis (X) is employed as a measurement algorithm to be able to electronically compensate the image data. This enables the multi-pen thermal ink jet printer 10 of the present invention to accurately overlay the primary color dots, thus resulting in a high quality image being produced.

By way of illustrative example, the detect/no detect data can be analyzed as follows. Each of the comb pattern horizontal edges is identified by number E=1, N, for N edges, for example, starting at the top edge. As to each pen, the nozzles are identified by a number P=1, M, for M nozzles, for example, starting at the top nozzle. Pursuant to the detect/no detect data for a pen, for each edge a a nozzle is identified as being closest to such edge. To determine offset between two pens in the media scan direction (X), the difference between respective nozzle position numbers is calculated for each horizontal edge. The differences are then added together, and the sum is divided by the number of edges N. Such offset is expressed in terms of nozzle rows and the equation for the calculation is as follows:

$$\text{delta } X = \left[ \sum_{i=1}^{N} (B(i) - A(i)) \right] / N$$

wherein:

N = the number of vernier edges.

delta X = offset between pens A an dB in the X axis.

A(i) = the nozzle number of the nozzle of the pen A that is closest to the ith vernier edge.

B(i) = the nozzle number of the nozzle of the pen B that is closest to the ith vernier edge.

For nozzles that are substantially aligned, the above equation provides a delta X of zero.

The vernier is designed such that the horizontal edges are at spacings which are not integer multiples of the resolution of the printhead, which allows for greater resolution in locating each pen.

Referring now to FIG. 9, shown therein is an aperture plate 111 that can be utilized for all of the foregoing calibrations. The aperture plate includes an elongated vertical aperture edge 113 for the single edge detection procedure, a stair-step edge portion 115 for the multiple nozzle procedure, and vernier areas 117 for the X-axis calibration.

Thus, there has been described inter-pen offset determination and compensation in multi-pen thermal ink jet pen printing systems. It will be seen that the printer of the present invention measures drop location data in the nominal plane of the print media rather than at the orifice plate. It will be seen that the printer of the present invention detects drop position both in X and Y axes, not in just one axis. Also, it will be seen that the printer of the present invention compensates for directionality errors because it measures drop position in the nominal plane of th print media.

While the invention has been disclosed in the context of a thermal drop on demand ink jet printer, the invention can be employed with ink jet technologies in general, including other drop on demand ink jet systems and continuous ink jet systems.

It is to be understood that the above-described embodiments of the invention are merely illustrative of the many possible specific embodiments which represent applications of the principles of the present invention. Numerous and varied other arrangements can be readily devised in accordance with these principles by those skilled in the art without departing from the scope of the invention.

What is claimed is:

1. Apparatus for providing inter-pen offset determination and compensation in a multi-pen ink jet printer, said apparatus comprising:
   (a) drop detector means for measuring a time of flight of ink drops between a selected pen and the detector means;
   (b) an aperture plate disposed at a print media plane; and
   (c) high resolution carriage position sensor means for determining carriage location when the time of flight exceeds a predetermined threshold value, whereby the sensed carriage position for respective pens provides information indicative of inter-pen offset.

2. Apparatus for providing inter-pen offset determination and compensation in a multi-pen ink jet printer, said apparatus comprising:
   (a) optical drop detector means for measuring a time of flight of ink drops between a selected pen and the detector means;
   (b) an aperture plate disposed at a print media plane; and
   (c) high resolution carriage position sensor means for determining carriage location when the time of flight exceeds a predetermined threshold value, whereby the sensed carriage positions for respective pens provides information indicative of inter-pen offset.

3. The apparatus of claim 2 which further comprises: interpolation means coupled to the carriage position sensor means and drop detector means for interpolating the position of the carriage at the time of the drop detection.

4. In a multi-pen ink jet printer having a movable carriage containing a plurality of pens, a registration calibration system comprising:
   (a) an optical drop detector for measuring flight time of drops of ink;
   (b) an aperture plate interposed between the pens and the drop detector for providing a precision location reference, and
   (c) high resolution carriage position sensor means integral with the carriage for indicating the position of the carriage at the instant the flight time of a drop of ink exceeds a predetermined threshold value as measured by the optical drop detector, whereby the sensed carriage positions for respective pens provides information indicative of inter-pen offset.

5. The apparatus of claim 4 wherein the aperture plate further comprises a stair-shaped aperture pattern disposed in the aperture plate, whereby a plurality of nozzles can be calibrated simultaneously.

6. In a multi-pen ink jet printer, a method for determining relative offset between pens, said method comprising the steps of:
   (a) positioning each pen over a vernier comb-like pattern in an aperture plate interposed between the pens and an optical drop detector;
   (b) firing each nozzle so that some of the drops impact the comb pattern and are not detected, while others pass through the comb pattern and are detected, creating a detect/no detect pattern for each pen; and
   (c) comparing patterns from each pen to determine the relative offsets from pen to pen.

7. A calibration system for providing inter-pen offset determination in a multi-pen ink jet printer, each pen having a nozzle array, the calibration system comprising:
   carriage means for scanning the ink jet pens along a pen scan direction;
   a drop detector for detecting a presence of ink drops from the pens;
   an aperture plate interposed between the pens and the drop detector, said aperture plate including an aperture pattern for providing a plurality of precision location references along the carriage scan direction for use with nozzles located at selected nozzle positions; and
   carriage position sensing means for indicating the position of the carriage when said drop detector indicates that the ink output of an ink firing nozzle traverses one of said precision location references, whereby the sensed carriage positions for respective pens provide information indicative of inter-pen offset.

8. The calibration system of claim 7 wherein said carriage means is controlled to move the pens such that the firing of a nozzle being used for calibration causes a detect to a no detect transition as the ink output of such nozzle traverses a precision location reference.

9. The calibration system of claim 7 wherein said aperture pattern includes edges orthogonal to the carriage scan direction and offset relative to each other in the carriage scan direction and in the media scan direction.

10. The calibration system of claim 9 wherein said aperture pattern includes a stair-step shaped boundary.

11. Apparatus for providing inter-pen offset determination in an ink jet printer having multiple ink jet pens having respective nozzle arrays, comprising:
    a drop detector for detecting a presence of ink drops from the ink jet pens;
    an aperture plate having an aperture pattern that includes areas through which ink drops can pass and be detected by said drop detector, whereby a detect/no detect pattern for each pen is produced by positioning each pen over the aperture pattern and individually firing the nozzles of the positioned pen.

12. The apparatus of claim 11 wherein said aperture pattern comprises a vernier pattern of openings.

* * * * *